United States Patent [19]

Friedmann

[11] Patent Number: 5,295,915
[45] Date of Patent: Mar. 22, 1994

[54] CONTINUOUSLY VARIABLE SPEED TRANSMISSION

[75] Inventor: Oswald Friedmann, Lichtenau, Fed. Rep. of Germany

[73] Assignee: Luk Lamellen und Kupplungsbau GmbH, Buhl, Fed. Rep. of Germany

[21] Appl. No.: 963,405

[22] Filed: Oct. 19, 1992

[30] Foreign Application Priority Data

Oct. 19, 1991 [DE] Fed. Rep. of Germany ....... 4134641

[51] Int. Cl.⁵ .................... F16H 9/18; F16H 11/02
[52] U.S. Cl. ................................ 474/18; 74/867
[58] Field of Search .............. 474/18, 28, 17, 69, 474/70, 11, 12, 8; 74/867, 868

[56] References Cited

U.S. PATENT DOCUMENTS 4,261,213  4/1981  Rattunde ......................... 474/18
5,046,991  9/1991  Friedmann ....................... 474/18

FOREIGN PATENT DOCUMENTS

2846546  4/1980  Fed. Rep. of Germany .

*Primary Examiner*—Douglas D. Watts
*Attorney, Agent, or Firm*—Darby & Darby

[57] ABSTRACT

A continuously variable speed transmission with first and second adjustable sheaves and an endless flexible element which is trained over the sheaves. A torque sensor is installed between a prime mover and the shaft for the first sheave to determine the axial position of the axially movable flange of the first sheave in dependency on the transmitted torque and the selected transmission ratio. The torque sensor employs an annulus of spherical rolling elements between the surfaces of two ramps one of which is movable axially of the shaft for the first sheave to initiate controlled radial and/or axial movements of the rolling elements. The surfaces of the ramps generate torque- and transmission ratio-dependent forces.

20 Claims, 5 Drawing Sheets

CONTINUOUSLY VARIABLE SPEED TRANSMISSION

BACKGROUND OF THE INVENTION

The invention relates to continuously variable speed transmissions in general, and more particularly to improvements in transmissions of the type wherein an endless flexible element is trained over two sheaves to transmit torque from an engine or another suitable torque applying device to a driven unit, e.g., in a motor vehicle. Still more particularly, the invention relates to improvements in transmissions of the type wherein at least one of the sheaves comprises an axially fixed and an axially movable flange and the movements of the axially movable flange are controlled, at least in part, by a torque sensor.

It is already known to provide a continuously variable speed transmission of the above outlined character with a torque sensor wherein spherical rolling elements are confined between two ramps serving to generate twisting and/or pressing forces in dependency on the torque and/or transmission ratio. Reference may be had, for example, to published German patent application Serial No. 28 46 546 wherein the rolling elements of the torque sensor are distributed in such a way that the rolling elements are not invariably capable of moving along the adjacent surfaces of the ramps. This results in the development of certain hysteresis which can adversely influence the operation of the transmission.

OBJECTS OF THE INVENTION

An object of the invention is to provide a continuously variable speed transmission which constitutes an improvement over and a further development of the transmission disclosed in published German patent application Serial No. 28 46 546.

Another object of the invention is to provide a continuously variable speed transmission which constitutes an improvement over and a further development of the transmission disclosed in commonly owned copending patent application Ser. No. 07/830,182 filed Jan. 31, 1992 by Norbert Indlekofer and Oswald Friedmann for "Continuously variable speed transmission".

A further object of the invention is to provide a novel and improved torque sensor for use in a continuously variable speed transmission.

An additional object of the invention is to provide a novel and improved combination of a torque sensor and an adjustable sheave with fixed and axially movable flanges for use in a continuously variable speed transmission.

Still another object of the invention is to provide a continuously variable speed transmission which embodies the above outlined torque sensor and wherein the torque sensor is constructed, installed and operated in such a way that the operation does not entail the development of undesirable hysteresis.

A further object of the invention is to provide a vehicle, e.g., a motor vehicle, which embodies the above outlined continuously variable speed transmission.

Another object of the invention is to provide the transmission with novel and improved means for regulating the transmission ratio in dependency on the applied torque and/or vice versa.

An additional object of the invention is to provide the aforediscussed torque sensor with novel and improved means for confining and guiding its rolling and/or spreading elements.

Still another object of the invention is to provide a transmission wherein the magnitude of transmitted torque can be regulated with a degree of precision higher than that achievable with heretofore known transmissions.

A further object of the invention is to provide a novel and improved method of operating a continuously variable speed transmission of the above outlined character.

Another object of the invention is to provide a novel and improved method of operating the above outlined torque sensor.

An additional object of the invention is to provide a continuously variable speed transmission whose useful life is longer than that of heretofore known transmissions.

Still another object of the invention is to provide a continuously variable speed transmission which can be produced and assembled at a cost less than that of conventional transmissions.

A further object of the invention is to provide a novel and improved sheave which can be utilized in a continuously variable speed transmission and embodies or is combined with a torque sensor of the above outlined character.

Another object of the invention is to provide an adjustable sheave which can be utilized in existing continuously variable speed transmissions as a superior substitute for heretofore known adjustable sheaves.

An additional object of the invention is to provide novel and improved means for moving the axially movable flange of an adjustable sheave relative to the other flange.

Still another object of the invention is to provide an adjustable sheave wherein the movable flange is combined with a torque sensor in a novel and improved way.

A further object of the invention is to provide a novel and improved hydraulic circuit for use in the above outlined torque sensor.

An additional object of the invention is to provide a novel and improved hydraulic circuit for use in conjunction with adjustable sheaves in a continuously variable speed transmission which embodies the above outlined torque sensor.

Another object of the invention is to provide a torque sensor which is more versatile than heretofore known torque sensors for use in continuously variable speed transmissions.

SUMMARY OF THE INVENTION

One feature of the present invention resides in the provision of a continuously variable speed transmission which comprises first and second sheaves rotatable about first and second axes, respectively, and at least one of these sheaves comprising a first flange and a second flange which is coaxial with and is movable axially toward and away from the first flange, an engine or other suitable means for applying torque to the first sheave, a tensionable endless flexible torque transmitting element which is trained over the first and second sheaves, and means for moving the second flange of the one sheave and to thus change the transmission ratio. The moving means comprises a torque sensor which is rotatable about one of the first and second axes, which is arranged to vary the tension of the flexible element, which is connected with the torque applying means, and which includes first and second surfaces serving to generate torque- and ratio-dependent forces as well as at least one rolling element in contact with and movable relative to the first and second surfaces at least radially of the one axis in response to changes of the transmission ratio.

Each sheave can comprise a first flange and a second flange which is coaxial with and is movable axially toward and away from the respective first flange.

The torque sensor can comprise a plurality of rolling elements between the first and second surfaces, and each rolling element can constitute a sphere (or at least one of such plurality of rolling elements can constitute a sphere).

The surfaces of the torque sensor can be configurated to further effect a movement of the at least one rolling element in the direction of the one axis in response to changes of transmission ratio.

In accordance with a presently preferred embodiment, the torque sensor comprises first and second ramps (e.g., in the form of coaxial discs) which are provided with the first and second surfaces, respectively. Each of these first and second surfaces can have a plurality of portions and each portion of one of these surfaces confronts a portion of the other surface. The confronting portions are inclined relative to each other at different angles.

If the at least one rolling element is a sphere, the first and second surfaces can be designed to define for the sphere substantially V-shaped aligned grooves extending substantially radially of the one axis. Such grooved surfaces can include flanks which are disposed in the respective grooves and provide for the at least one sphereical rolling element at least substantially parallel contact lines extending at least substantially tangentially of the at least one rolling element.

The surfaces of the torque sensor can include radially extending portions which transmit to the at least one rolling element a force generated by the transmitted torque and having a component extending in the radial direction of the one axis. Such force can have a second component acting upon the at least one rolling element in the direction of the one axis and preferably greatly exceeding (e.g., several times) the aforementioned component acting in the radial direction of the one axis.

The flexible element can be mounted to transmit torque from the first sheave to the second sheave, and the torque sensor is then preferably disposed between the torque applying means and the first sheave.

The moving means can further comprise at least one fluid operated (e.g., hydraulic) motor which is controlled by the torque sensor as a function of transmitted torque and the momentary transmission ratio.

The torque sensor is preferably rotatable about the axis of the one sheave, and the arrangement may be such that the at least one rolling element of the torque sensor is movable at least radially of the one axis in response to axial movement of the second flange, i.e., in response to changes of the transmission ratio. Such torque sensor can further comprise a cage for the at least one rolling element, and such cage can be connected with the axially movable second flange. Alternatively, the second flange can comprise or can carry a conical (e.g., frustoconical) guide for the at least one rolling element of the torque sensor. Such guide is preferably coaxial with the torque sensor and can include a conical (e.g., frustoconical) surface with a diameter which increases in the direction of the one axis toward the second flange.

The one sheave can further comprise a shaft which non-rotatably supports the flanges.

Another feature of the invention resides in the provision of a continuously variable speed torque transmitting transmission which comprises first and second sheaves rotatable about first and second axes, respectively. Each sheave comprises a first flange and a second flange which is coaxial with and is movable axially toward and away from the respective first flange, and at least one sheave further comprises a rotary shaft which non-rotatably mounts the respective first and second flanges. The transmission further comprises means for applying torque to the first sheave, an endless flexible torque transmitting element which is trained over the two sheaves, and means for moving the second flange of the at least one sheave. Such moving means comprises at least one fluid operated motor (e.g., a hydraulic cylinder and piston unit) and means for supplying pressurized fluid to the motor as a function of the load upon and the ratio of the improved transmission. Such supplying means comprises a pump, and a torque sensor which receives fluid from the pump and has at least one pressure regulating valve, first and second surfaces serving to generate load- and transmission ratio-dependent forces, and at least one rolling element in contact with the surfaces and serving to transmit to the at least one sheave the entire torque which is to be transmitted by the transmission.

The novel features which are considered as characteristic of the invention are set forth in particular in the appended claims. The improved transmission itself, however, both as to its construction and its mode of operation, together with additional features and advantages thereof and of its torque sensor, will be best understood upon perusal of the following detailed description of certain presently preferred specific embodiments with reference to the accompanying drawings.

DESCRIPTION OF PREFERRED EMBODIMENTS

Figure 1:
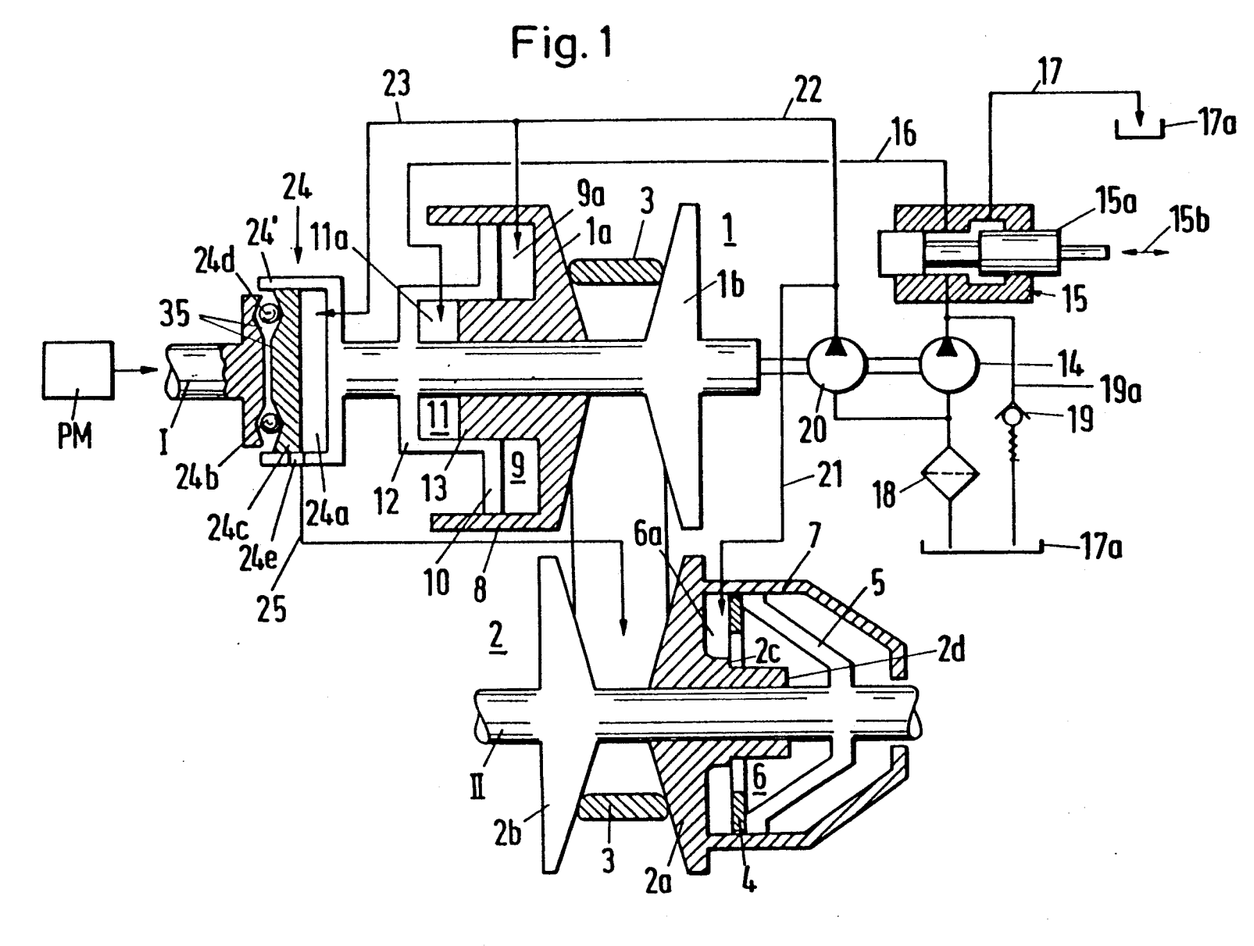
FIG. 1 is a fragmentary schematic partly elevational and partly sectional view of a continuously variable speed transmission which can utilize the improved torque sensor, the torque sensor being shown only schematically in an axial sectional view.

FIG. 1 shows a portion of a continuously variable speed transmission which comprises a rotary input member 1 in the form of a shaft carrying the fixedly mounted flange 1b and the axially movably mounted flange 1a of a first adjustable sheave 1. The flange 1b can be of one piece with the shaft I or is fixedly secured thereto in any suitable way. The flange 1a is movable axially of but cannot rotate on the shaft I.

The shaft I is parallel with a rotary output member II here shown as a second shaft which carries a second adjustable sheave 2. The latter comprises a flange 2b which is of one piece with or is fixedly secured to the shaft II, and a flange 2a which is axially movably but non-rotatably installed on the shaft II. An endless flexible chain, belt or another endless flexible torque transmitting element 3 is trained over the adjustable sheaves 1 and 2 to transmit torque from an engine or another prime mover PM (which applies torque to the shaft I through a novel and improved torque sensor 24) to one or more parts (e.g., wheels, not shown) which are mounted to receive torque from the shaft II.

FIG. 1 further shows a diaphragm spring 4 serving to apply to the axially movable flange 2a of the sheave 2 a force having a magnitude which is a function of the transmission ratio. The mounting of the diaphragm spring 4 is such that the magnitude of the force which is applied by the flange 2a to the adjacent portion of the flexible element 3 increases when the looped upper portion of the element 3 (as viewed in FIG. 1) is nearer to the axis of the shaft I and that the magnitude of such force decreases when the looped upper portion of the element 3 is caused or permitted to move further away from such axis. The common axis of the shaft I and sheave 1 is further common to the torque sensor 24. The illustrated diaphragm spring 4 has radially inwardly extending prongs which bear against an external shoulder 2c on a centrally located hub 2b of the axially movable flange 2a, and an annular radially outer portion reacting against a substantially conical piston 5 which is of one piece with or is rigidly affixed to the shaft II. The piston 5 forms part of a fluid-operated motor 6 here shown as a hydraulic cylinder and piston unit. The latter has a cylinder chamber 6a and the diaphragm spring 4 is installed in such chamber. The cylinder 7 of the unit 6 is of one piece with or is rigidly secured to the axially movable flange 2a of the second sheave 2.

The diaphragm spring 4 urges the flange 2a axially toward the flange 2b so that, when the flange 2a is free to follow the bias of the spring 4, it causes the looped lower portion of the endless flexible element 3 to move away from the axis of the shaft II; i.e., the looped upper portion of the flexible element 3 is then compelled to move nearer to the axis of the shaft I.

A second fluid operated motor 9 is provided to move the flange 1a of the sheave 1 relative to the flange 1b. This motor comprises a cylinder 8 which is of one piece with or is affixed to the flange 1a, and a washer-like piston 10 which is of one piece with or is rigid with the shaft I. The manner in which the flange 1a is held against rotation relative to the shaft I is not shown in FIG. 1; the same applies for the manner of non-rotatably but axially movably mounting the flange 2a on the shaft II.

The motor 9 is connected in parallel with a third fluid operated motor 11 including a piston 13 constituting the hub of the flange 1a and a cylinder 12 which is of one piece with or is rigidly secured to the shaft I. In the transmission of FIG. 1, the piston 10 of the motor 9 is of one piece with the cylinder 12 of the motor 11. The motor 9 is located radially outwardly of the motor 11.

The shaft I drives a pump 14 which delivers pressurized hydraulic fluid (e.g., oil) to a conduit 16 containing a simple slide valve 15 (e.g., a 3/2-way valve). The reciprocable piston-like valving element 15a of the valve 15 is movable to any one of a plurality of different positions in directions which are indicated by a double-headed arrow 15b. The adjustments in the axial position of the valving element 15a will be carried out in dependency on the desired or required ratio of the transmission. The conduit 16 can discharge pressurized fluid into the cylinder chamber 11a of the motor 11. If the valving element 15a is moved to a position to the left of that shown in FIG. 1, it can seal the cylinder chamber 11a from the pump 14 so that the latter delivers pressurized fluid back to the sump 17a through a conduit 17. When the valve 15 permits pressurized fluid to flow into the cylinder chamber 11a, the flange 1a of the sheave 1 moves toward the flange 1b so that the adjacent looped portion of the endless flexible element 3 moves radially of and away from the axis of the shaft I. This causes the looped lower portion of the flexible element 3 to move toward the axis of the shaft II so that the element 3 causes the axially movable flange 2a of the sheave 2 to stress the diaphragm spring 4.

The intake of the pump 14 draws fluid from the sump 17a through an oil filter 18. A pressure relief valve 19 in a conduit 19a is provided to return fluid from the outlet of the pump 14 into the sump 17a when the fluid pressure in the conduit 16 reaches a preselected maximum permissible value.

The means for generating fluid pressure which is dependent upon the torque comprises a pump 20 which draws fluid from the sump 17a through the aforementioned filter 18 and serves to deliver pressurized fluid into conduits 21, 22 and 23. The pump 20 is driven by the shaft I. The conduit 21 delivers pressurized fluid into the cylinder chamber 6a of the motor 6, the conduit 22 delivers pressurized fluid into the cylinder chamber 9a of the motor 9, and the conduit 23 can deliver pressurized fluid to the cylinder chamber or space 24a of the torque sensor 24. The latter can be said to constitute a valve which is controlled in dependency upon the transmission ratio and torque and transmits torque directly from the prime mover PM to the flanges 1a, 1b of the sheave 1 on the shaft I.

The illustrated torque sensor 24 further comprises a fixedly mounted ramp 24b which is of one piece with or is rigidly affixed to the shaft I, an axially movable ramp 24c which extends into the chamber 24a, and a set of spherical rolling elements 24d between the adjacent specially configurated surfaces 35 of the ramps 24a, 24c. The part 24' of the torque sensor 24 constitutes a cylinder for the ramp 24c which latter acts not unlike a valving element or piston and can expel pressurized fluid from the chamber 24a in response to axial movement of the ramps 24a, 24c relative to each other, i.e., in response to changes in the axial position of the ramp 24c relative to the ramp 24b. The rolling elements 24d (hereinafter called balls for short) serve to change the axial position of the ramp 24c in response to turning of the shaft I and ramp 24b relative to the ramps 24c and/or vice versa.

The cylinder 24' of the torque sensor 24 has an outlet port 24e which can admit leak fluid into a conduit 25 serving to deliver lubricant to the endless flexible element 3 and to the two pairs of flanges 1a, 1b and 2a, 2b. Depending on the selected transmission ratio and the magnitude of torque which is being transmitted between the ramps 24b and 24c, the ramp 24c (which, as already stated above, acts as a valving element or piston of a valve constituting or including the torque sensor 24) will expose the outlet 24e to an appropriate extent. Axial movement of the ramp 24c in a direction to the right (as viewed in FIG. 1) entails a reduction of flow of pressurized fluid (admitted via conduit 23) through the conduit 25 so that the pressure in the chamber 24a rises together with the pressure in the conduits 21, 22, 23 and hence also in the cylinder chambers 6a and 9a. Such pressure corresponds to the prevailing torque between the ramps 24b, 24c and to the transmission ratio. Since the motors 9 and 11 are connected in parallel, the pressure which is dependent upon the transmission ratio and upon the transmitted torque is added to that pressure which is required to select the transmission ratio.

The quantity of liquid which is conveyed by the pump 20 is relatively small. Such quantity should suffice to compensate for losses due to leakage at the outlet 24e of the torque sensor 24, for losses due to leakage of some fluid from various conduits and chambers, and for eventual widening of the conduits and/or other liquid paths in response to a pressure rise in the cylinder chambers 9a and 24a. At any rate, the pump 20 need not generate, for this part of pressure which is proportional to the torque, any hydraulic energy other than that which is required to compensate for the aforediscussed leakage losses and losses owing to expansion of the liquid paths. The reason is that compensation for volumetric changes (in the cylinder chambers 9a and 6a), which take place simultaneously with a change of transmission ratio, merely involves back and forth flow (i.e., exchange) of one and the same pressurized fluid. The energy requirements of the pump 20 are in the order of approximately one-sixth of total energy requirements of heretofore known apparatus. Therefore, the sum of the energy requirements (and the combined outputs) of the pumps 14 and 20 are considerably less than in accordance with heretofore known proposals.

The diaphragm spring 4 can be replaced with a second fluid operated motor so that the movements of the flange 2a are then also initiated by two discrete motors, the same as described and shown for the flange 1a of the sheave 1. Thus, the motor 6 and the spring 4 for the flange 2a can be replaced with two motors corresponding to the motors 9 and 11 for the flange 1a. The motor replacing the spring 4 can be installed radially inwardly of the motor 6, and its operation can be controlled by a more complex slide valve, e.g., a valve of the type shown at 36 in FIG. 2 of commonly owned U.S. Pat. No. 5,046,991 granted Sept. 10, 1991 to Oswald Friedmann for "Continuously variable speed transmission". The disclosure of this patent is incorporated herein by reference. The valve 36 which is shown in FIG. 2 of the patent to Friedmann would replace the valve 15 in FIG. 1 and would further serve to control the flow of fluid to and from the second fluid operated motor replacing the diaphragm spring 4.

Figure 2:
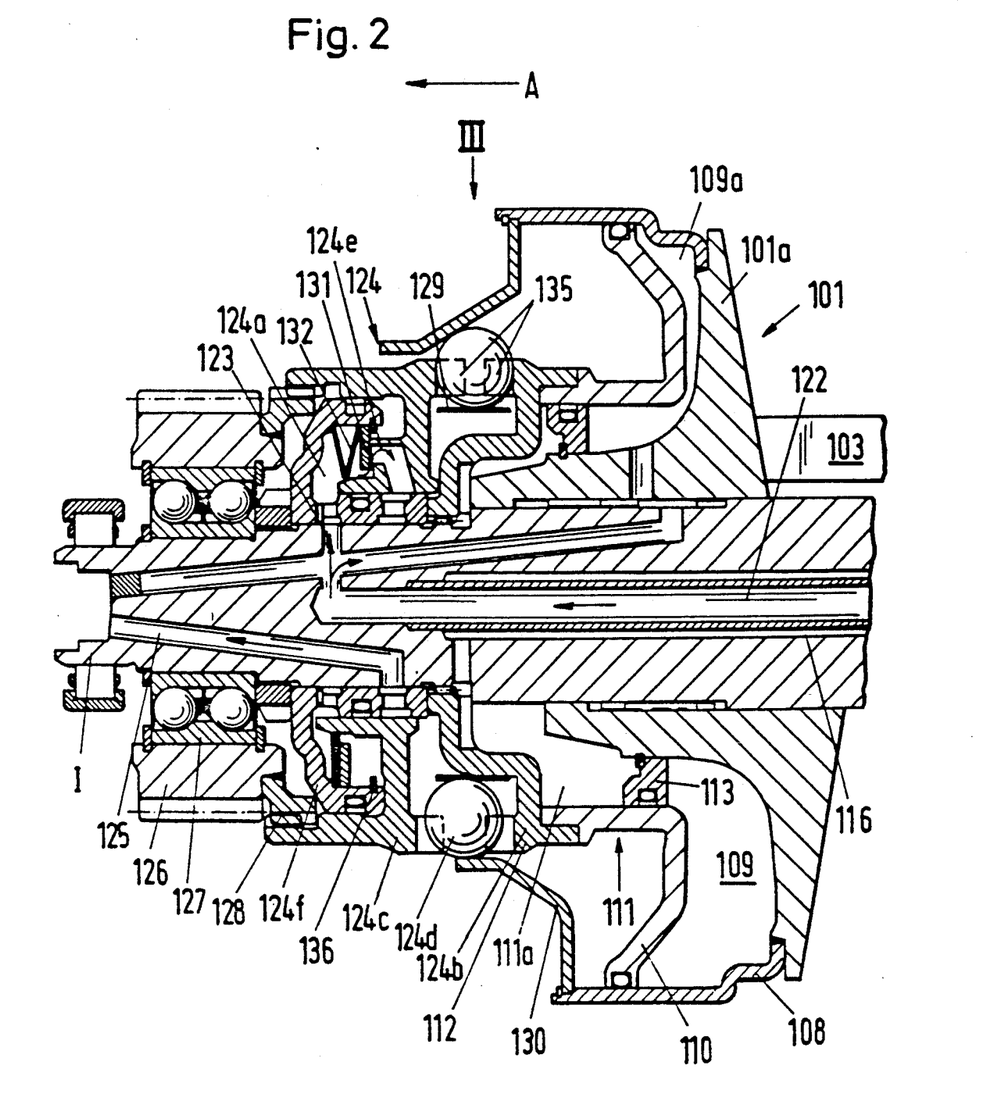
FIG. 2 is a fragmentary axial sectional view of a transmission employing a fully illustrated torque sensor which embodies one form of the present invention, the upper half showing one rolling element of the torque sensor in a first position and the lower half showing a rolling element in a different second position.

FIG. 2 shows a portion of a continuously variable speed transmission embodying one form of a presently preferred torque sensor 124. All such parts of the transmission of FIG. 2 which are identical with or clearly analogous to corresponding parts of the transmission of FIG. 1 are denoted by similar reference characters plus 100. The torque sensor 124 of FIG. 2 is installed in the same way as shown in FIG. 1, namely so that the common axis of its ramps 124b, 124c coincides with the common axis of the shaft I and adjustable sheave 101. Only the axially movable flange 101a of this sheave is shown in FIG. 2. The shaft I can receive torque from an internal combustion engine or from another suitable prime mover. FIG. 2 shows that the shaft I is surrounded by a spur gear 126 mounted on an antifriction bearing 127 which, in turn, is mounted on the shaft I. The gear 126 is non-rotatably coupled to the axially movable substantially disc-shaped ramp 124c which is angularly and axially movable on the shaft I. The coupling between the gear 127 and the axially and angularly movable ramp 124c comprises an annulus of gear teeth 128.

The substantially disc-shaped ramp 124c and the other substantially disc-shaped ramp 124b of the torque sensor 124 are provided with confronting surfaces 135 which contact the adjacent portions of a set or array of annularly arranged spherical rolling elements 124d (hereinafter balls for short). The balls 124d can be said to constitute spreading elements which can move the ramp 124c axially of the shaft I and away from the ramp 124b. A resilient element 129 is provided between the ramps 124b, 124c to urge the balls 124d radially outwardly. The purpose of the resilient element 129 is to maintain the balls 124d in contact with the surfaces 135 when the transmission embodying the structure of FIG. 2 is idle. This reduces the likelihood of undesirable jamming of the ramps 124b, 124c during starting of the transmission, i.e., until the RPM of the torque sensor 124 reaches a value at which the balls 124d are reliably urged radially outwardly against the surfaces 135 of the ramps 124b, 124c under the action of centrifugal force.

The ramp 124b (which is fixedly secured to the shaft I against axial and angular movements relative thereto) constitutes the cylinder 112 of a fluid operated motor 111 which is located radially inwardly of a second fluid operated motor 109. The radially outer portion of the ramp or cylinder 124b (112) is of one piece with or is rigidly connected to the piston 110 of the fluid-operated motor 109. The piston 113 of the motor 111 and the cylinder 108 of the motor 109 are fixedly secured to the axially movable flange 101a of the adjustable sheave 101. The flange 101a is axially movably mounted on the shaft I, and the piston 113 and cylinder 108 share the axial movements of the flange 101a.

The cylinder 108 is rotatably connected with a frustoconical guide member 130 in such a way that the parts 108 and 130 cannot move axially of and relative to each other. Depending on its axial position (i.e., depending on the selected transmission ratio), the guide member 130 determines the radial movability of the balls 124d of the torque sensor 124 in a direction away from the axis of the shaft I. The aforementioned resilient element 129 urges the balls 124d against the frustoconical internal surface of the guide member 130.

The cylinder chamber or space 124a of the torque sensor 124 can be said to constitute a torque-dependent part which is flanked by the ramp 124c and by a further part or casing 124f. The cylinder chamber 124a confines a valve having a plate-like valving element 131 and an energy storing device 132. In the embodiment of FIG. 2, the energy storing device 132 is composed of two diaphragm springs which are inclined in opposite directions. The purpose of the energy storing device 132 is to urge the plate-like valving element 131 in a direction counter to that indicated by an arrow A, namely in a direction toward the outlet 124e of the cylinder chamber 124a of the torque sensor 124. The outlet 124e is a port which is provided in the ramp 124c, i.e., in an axially movable part of the torque sensor 124. The valve including the plate-like valving element 131 in the cylinder chamber 124a is carried by the casing 124f which is not free to move in the axial direction of the shaft I.

In order to select the required or desired transmission ratio, the chamber 111a of the fluid operated motor 111 receives pressurized hydraulic fluid through a conduit 116 which is shown as including an axially extending channel in the shaft I. The axially extending channel of the conduit 116 confines a pipe or hose 122 corresponding to the conduit 22 of FIG. 1 and serving to supply pressurized fluid to the cylinder chamber 109a of the motor 109 which can exert upon the axially movable flange 101a of the sheave 101 an axial force that is a function of the transmission ratio as well as a function of the transmitted torque. The conduit or pipe 122 further serves to supply pressurized fluid to the cylinder chamber 124a of the torque sensor 124 through a radial passage 123 which is provided in the shaft I and corresponds to the conduit 23 of FIG. 1. A channel or conduit 125 of the shaft I serves to return fluid to the sump and receives fluid from the outlet 124e of the cylinder chamber 124a of the torque sensor 124.

Figure 3:
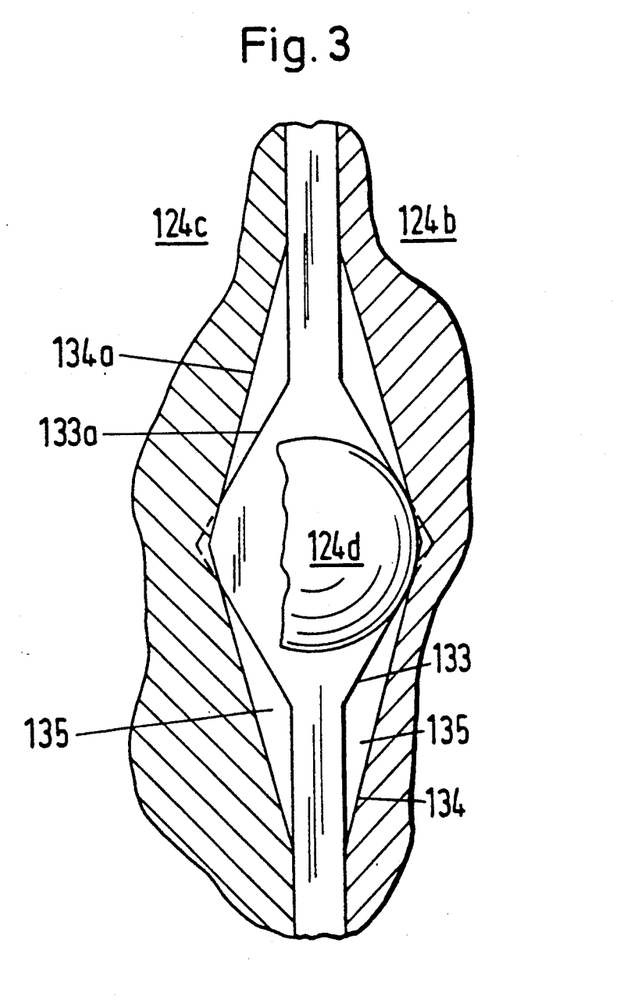
FIG. 3 is an enlarged view of a detail substantially as seen in the direction of arrow III in FIG. 2.

FIG. 3 shows, drawn to a larger scale, certain parts of surfaces 135 on the ramps 124b, 124c of the torque sensor 124 of FIG. 2. The view is taken in the direction of arrow III in FIG. 2. The radially inner portions 133 of the surface on the ramp 124b or 124c make a smaller angle than the radially outer portions 134 of such surface on the same ramp. The surfaces 135 of the two ramps 124b, 124c are twisted or wound in space to provide grooves or tracks for the rolling elements 124d whereby the rolling elements transmit forces having components in the radial and axial directions of the shaft I. The configuration of the surfaces 135 is such that the locations of tangents at the loci of contact with the balls 124d together with the ratio of the magnitude of circumferential and axial components of the aforementioned force change in response to variations of transmission ratio.

The configuration of those confronting portions of surfaces 135 on the ramps 124b, 124c which contact the balls 124d is such that these confronting portions are (at least for all practical purposes) always parallel to each other. Otherwise stated, the pairs of tangents to those points of balls 124d which are contacted by the surfaces 135 (with reference to the momentary radius of the annulus formed by the balls 124d) are parallel to each other. This ensures that the balls 124d can invariably roll, without slippage or skidding, between the surfaces 135 of the ramps 124b and 124c. Stated in still another way, the axes of rotation of the balls 124d are always (or nearly always) at least approximately normal to the axis of rotation of the axially movable flange 101a (which rotates with the shaft I).

In order to ensure optimal conformance of the required pressure between the balls 124d and the surfaces 135 of the ramps 124b, 124c to the torque which is to be transmitted to the shaft II, it is often desirable and advantageous to configurate the surfaces 135 in such a way that the slopes for the balls 124d vary at least in part along those portions of such surfaces which are contacted by the balls in response to variations of the transmission ratio. This ensures that the axial stress upon the axially movable ramp 124c is properly related to the torque and to the transmission ratio during each and every stage of axial movement of the axially movable flange 101a.

Each of the balls 124d can be installed for movement in two aligned V-shaped grooves provided in the surfaces 135 and extending substantially radially of the axis of the shaft I. The surfaces 135 are then provided with flanks which are disposed in the V-shaped grooves for the balls 124d and establish for the balls parallel contact lines extending tangentially of the balls. The flanks in a V-shaped groove for a particular ball 124d are located substantially diametrically opposite each other with reference to the radius of the annulus which is then formed by the balls 124d. Such configuration of the surfaces 135 further ensures that the balls 124d are compelled to roll rather than slip or skid between the surfaces 135. This means that the axis about which a ball 124 rotates in response to the development of a surge of torque is always, or practically always, normal to the axis of rotation of the respective flanges (such as the flange 101a and the non-illustrated other flange of the adjustable sheave 101 which is shown in FIG. 2). Elimination of skidding or slipping movements of balls 124d, which would entail potentially damaging and undesirable friction between the balls 124d and the surfaces 135 of the ramps 124b and 124c, contributes to longer useful life of the torque sensor 124 and of the entire transmission.

The aforementioned flanks in substantially V-shaped grooves of the surfaces 135 include first flanks which are engaged by the respective balls 124d during rotation of the shaft I in a first direction, and second flanks which are engaged by the balls 124d during rotation of the shaft I in the opposite direction. The flanks which are engaged by the balls during rotation of the shaft I in the first direction can be similar to the other flanks so that the tensioning of the endless flexible element 103 for transmission of a particular torque and for a particular transmission ratio can be the same regardless of the direction of rotation of the shaft I. However, it is equally possible to provide the surfaces 135 with a first set of flanks which are engaged by the respective balls 124d during rotation of the shaft I in a first direction, and with a different set of flanks which are engaged by the balls during rotation of the shaft I in the opposite direction. The two sets of flanks can have different slopes so that, when the direction of transmission of torque is reversed (e.g., from operation with pull to coasting if the improved transmission is incorporated in a motor vehicle), the magnitude of the force acting upon the endless flexible element 103 will change. For example, the flanks in the grooves for the balls 124d can be configurated in such a way that the force acting upon the endless flexible element 103 is larger during operation with pull than during coasting.

The surfaces 135, or the flanks which are provided in the grooves of such surfaces to ensure controlled movements of the balls 124d, can extend radially of the shaft I in such a way that the torque to be transmitted generates a force having a radial component acting upon the balls 124d. Such radial component is small or extremely small when compared with the axial component which acts upon the endless flexible element 103 and the ramps 124b, 124c. The axial component is transmitted by the balls 124d. The component of force acting upon each of the discrete balls 124d can be generated by imparting to the aforediscussed flanks for the balls different angles or slopes as considered in the radial direction of the shaft I. For example, at least two but preferably all four flanks which cooperate with a particular ball 124d can be configurated in such a way that (when considered in the radial direction) they exhibit, with reference to a plane which is normal to the axis of rotation of the ramps 124b and 124c, a more pronounced slope radially inwardly than radially outwardly. There is a continuous and gradual transition between the more pronounced radially inner slope and the less pronounced radially outer slope. Otherwise stated, the V-shaped grooves, or recesses have a more pronounced inclination radially outwardly than radially inwardly, i.e., the angle between the two flanks in a groove is larger radially outwardly than radially inwardly which ensures that the flanks constitute three dimensional slightly twisted or wound surfaces. The gradual increase or decrease of the angle between the flanks in a groove can take place radially inwardly or radially outwardly, depending on the intended utilization. For proper operation of the transmission, the smallest angle of the flanks with reference to a plane which is normal to the axis of rotation of the ramps 124b, 124c can be in the range of 10° to 30°, preferably between 15° and 20°, and the maximum angle can be in the range of 20° to 50°, preferably between 30° and 40°.

The improved transmission can employ a plurality of torque sensors. If the transmission employs a single torque sensor, the single sensor is preferably installed between the prime mover PM and the first sheave (such as 1 or 101).

The upper half of FIG. 2 shows the illustrated parts of the improved transmission in the positions they assume when the transmission is idle. The axially movable flange 101a of the adjustable sheave 101 is located in the left-hand end position in which it is, or can be, arrested by a stop serving to prevent further movement of such flange in the direction of arrow A. In other words, the flange 101a is located at a maximum axial distance from the other flange (corresponding to the flange 1b of FIG. 1) so that the illustrated looped portion of the endless flexible element 103 is disposed at a minimum radial distance from the axis of the shaft I. The plate-like valving element 131 in the cylinder chamber 124a of the torque sensor 124 is biased by the energy storing device 132 in a direction counter to that indicated by the arrow A, and its radially outermost portion bears against an abutment or stop 136, e.g., a split ring which is recessed into the internal surface of the casing 124f of the torque sensor 124. Such positioning of the valving element 131 when the improved transmission is idle ensures that a clearance remains between the right-hand side of the valving element 131 and the outlet 124e. Such clearance can have a width in the range of 0.2 to 0.8 mm and permits some leakage of hydraulic fluid into the channel or conduit 125. The resilient element 129 biases the balls 124d radially outwardly against the frustoconical internal surface of the guide meter 130.

When the primary side of the transmission is set in rotary motion, i.e., when the prime mover corresponding to the prime mover PM of FIG. 1 begins to rotate the shaft I together the two flanges of the adjustable sheave 101 and the torque sensor 124, the shaft I starts to operate two pumps corresponding to the pumps 14 and 20 of FIG. 1. The first pump (corresponding to the pump 14 of FIG. 1) forces pressurized fluid into the conduit or channel 116 of the shaft I in dependency on the transmission ratio which is selected by appropriate setting of the valving element 15a of the valve 15 of FIG. 1. The conduit 116 admits pressurized fluid into the cylinder chamber 111a of the motor 111 to build in the chamber 111a a pressure corresponding to the magnitude of that force which is exerted by the axially movable flange 101a against the endless flexible element 103 and which is necessary in order to maintain the desired transmission ratio as well as to transmit a certain portion of the applied torque. At the same time, the second pump (corresponding to the pump 20 of FIG. 1) supplies pressurized fluid to the pipe or conduit 122 whence the fluid enters the cylinder chamber 109a of the motor 109 and, through the passage or conduit 123, the cylinder chamber 124a of the torque sensor 124. As already described and as shown in FIG. 2, the conduit 123 branches from the conduit 122, the same as in the transmission of FIG. 1. Such torque-dependent pressure of fluid is modified or corrected in dependency on the transmission ratio and is further regulated as a function of changes of the effective area of the outlet 124e for the escape of pressurized fluid from the cylinder chamber 124a of the torque sensor 124, i.e., in dependency on changes in the position of the valve plate 131 in the chamber 124a and the outlet 124e relative to each other.

The shaft I receives torque from the prime mover PM by way of the gear 126 which rotates the ramp 124c through the annulus of teeth 128. The ramp 124c transmits torque to the ramp 124b (and hence to the shaft I and flanges of the sheave 101) through the balls 124d of the torque sensor 124. The ramp 124c is movable axially of but the ramp 124b is rigid with the shaft I and thus rotates with the flanges (including the flange 101a) of the sheave 101 on the shaft I. The endless flexible element 103 transmits torque to the other sheave (corresponding to the sheave 2 of FIG. 2) and thence to the shaft II which drives one or more movable parts, not shown, e.g., the wheels of a motor vehicle.

When the ramp 124c receives torque from the gear 126, it causes the surfaces 135 to contact the balls 124d whereby the balls roll along the adjacent portions of the three-dimensional surfaces 135 in such a way that they bear against the axially non-yieldable ramp 124b. The balls 124d exert pressure against the ramp 124c in the direction of arrow A, i.e., such pressure is exerted against the ramp which is movable axially as well as circumferentially of the shaft I. The ramp 124c will be shifted in response to changes of transmitted torque. The valving element 131 continues to bear against the abutment or stop 136 (under the action of the energy storing device 132) but the width of the clearance between the valving element 131 and the outlet 124e is reduced nevertheless (i.e., the throttling or flow restricting action of the valving element 131 is increased) because the valving element 131 reduces the rate of flow of fluid from the cylinder chamber 124a into the conduit 125. This results in a rise of pressure in the chamber 124a, in the conduits 123 and 122, and hence also in the cylinder chamber 109a of the motor 109. The rise of pressure of such fluid is proportional to the transmitted torque at the selected transmission ratio during the corresponding stage of starting of the transmission. The upper portion of FIG. 2 illustrates various parts of the transmission in positions they assume when the selected transmission ratio assumes a minimum value. Such position or condition can be termed a "low position"; the illustrated looped portion of the endless flexible element 103 is then located at a minimum radial distance from the axis of the shaft I. Therefore, the other looped portion of the endless flexible element 103 is located at a maximum distance from the axis of the shaft II so that the RPM of the shaft II (in comparison with the RPM of the shaft I) is at a lowest value. Thus, if the engine or another prime mover PM applies to the shaft I a maximal torque (through the torque sensor 124), the flange 101a must bear against the adjacent looped portion of the endless flexible element 103 with a maximum force in order to ensure that the maximum torque will be transmitted to the second sheave on the shaft II. Thus, it is necessary to raise the pressure of fluid in the cylinder chamber 111a of the motor 111 to a maximum value. During such normal stage of operation of the improved transmission, when the width of the clearance between the valving element 131 and the outlet 124e varies but continues to exist, a state of equilibrium develops in that the axially movable ramp 124c bears against the cushion of pressurized fluid (e.g., oil or another suitable liquid lubricant) in the cylinder chamber 124a of the torque sensor 124.

The lower half of FIG. 2 illustrates the axially movable flange 101a of the adjustable sheave 101 in the other end position at a minimum distance from the other (axially fixed) flange corresponding to the flange 1b of FIG. 1. The illustrated looped portion of the endless flexible element 103 is then located at a maximum distance from the axis of the shaft I because the cylinder chamber 111a of the motor 111 has received pressurized fluid and has moved the flange 101a counter to the direction of arrow A, i.e., to the right as seen in FIG. 2. Such movement of the flange 101a toward the other flange of the adjustable sheave 101 resulted in radially outward movement of the illustrated looped portion of the endless flexible element 103. The shaft II is then driven at a maximum rotational speed, e.g., to drive a motor vehicle at a maximum speed or within the partial load range, i.e., when the vehicle is not required to furnish a high or very high output torque. The guide member 130 then maintains the balls 124d in their radially innermost positions (at the selected transmission ratio). The frustoconical internal surface of the guide member 130 then effects, in dependency on the transmission ratio, the torque-dependent correction of pressure.

The parts which are shown in the lower half of FIG. 2 assume such positions in the event of an extreme (maximal) surge of transmitted torque. The surge causes an angular displacement of the ramps 124b, 124c relative to each other while the balls 124d continue to contact the two surfaces 135. The aforediscussed configuration of the surfaces 135 on the ramps 124b, 124c ensures that the force which is being transmitted during a surge of torque develops an axial component which is sufficient to move the axially movable ramp 124c of the torque sensor 124 in the direction of arrow A (i.e., to the left, as viewed in FIG. 2), for example (namely in the event of maximum surge of transmitted torque), all the way axially into abutment with the part or casing 124f. Such axial shifting of the ramp 124c results in sealing of the outlet 124e from the chamber 124a by the valving element 131. If the ramp 124c continues to move in the direction of arrow A, the shoulder of the ramp 124c adjacent its outlet 124e begins to shift the valving element 131 against the opposition of the energy storing device 132, i.e., the valving element 131 is forced to move away from the abutment or stop 136 whereby the outlet 124e becomes closed or remains closed. Since the pump 20 continues to supply pressurized fluid to the conduits 122 and 123 at a constant volumetric rate while the outlet 124e is sealed, the pressure of fluid in the system including the chamber 124a of the torque sensor 124, the conduits 123 and 122 and the cylinder chamber 109a of the motor 109 rises very rapidly (theoretically to an infinitely large value). Such abrupt rise of fluid pressure, i.e., actually a surge of pressure, causes an enlargement of the radially outer cylinder chamber 109 and of the corresponding radially outer cylinder chamber of the secondary sheave corresponding to the adjustable sheave 2 of FIG. 1. Thus, and referring to the lower half of FIG. 2, an abrupt surge of fluid pressure in the cylinder chamber 109a can result in outward bulging of the cylinder 108. Bulging of the cylinder 108 results in rapid increase of the capacity of the chamber 109a such as cannot be immediately compensated for by the pump 20 via conduit 122; this would result in the application of insufficient force by the axially movable flange 101a against the adjacent portion of the endless flexible element 103. In order to compensate for any abrupt drop of pressure due to expansion or bulging of the cylinder 108, the torque sensor 124 then acts not unlike an additional or auxiliary pump because the axially movable ramp 124c continues to move in the direction of arrow A subsequent to sealing of the outlet 124e from the chamber 124a. This reduces the volume of the chamber 124a so that the torque sensor 124 forces the pressurized fluid from the chamber 124a back into the conduit 123 (against the opposition of the pump 20 which supplies pressurized fluid into the conduits 122 and 123. Such fluid (which is expelled from the chamber 124a as a result of movement of the ramp 124c in the direction of arrow A) is caused to penetrate into the outer motor 109 of the flange 101a and into the outer motor of the other axially movable flange 2a in order to compensate for bulging or other deformation of the respective cylinders (including the cylinder 108 of FIG. 2) and to thus ensure that the endless flexible element 103 is engaged between the two pairs of flanges with a force which is required to transmit torque without any slippage of the element 103 relative to the flanges of the sheave 101 and/or relative to the flanges of the other sheave (2). Thus, the torque sensor 124 will perform the additional function of an auxiliary pump in order to avoid slippage of the endless flexible element 103 when the transmission of FIG. 2 is called upon to transmit pronounced surges of torque.

Those mutual positions of various parts of the torque sensor 124 which are shown in the upper and lower halves of FIG. 2 are the two extreme positions. It will be seen that, when the selected transmission ratio assumes a lowest value (the endless flexible element 103 is nearest to the axis of the shaft I), i.e., when the balls 124d are located at a maximum radial distance from the axis of the shaft I), the axially movable ramp 124c of the torque sensor 124 can be moved to its leftmost position in order to compensate for an abrupt surge of torque. As stated hereinabove, this can involve a movement of the ramp 124c in the direction of arrow A all the way into engagement with the part or casing 124f. On the other hand, and if the transmission of torque takes place without any surges, and when the selected transmission ratio assumes a maximum value (with the endless flexible element 103 located at a maximum radial distance from the axis of the shaft I and the balls 124d located at a minimal radial distance from the axis of the shaft I), the valving element 131 in the chamber 124a of the torque sensor 124 can engage the abutment or stop 136 and can be spaced apart from the ramp 124c which has been shifted in a direction to the right (counter to the direction of arrow A), i.e., there exists a clearance for the flow of fluid from the chamber 124a, through the outlet 124e and into the conduit 125. During normal operation, the various parts of the torque sensor 124 will assume positions somewhere between the aforedescribed and illustrated extreme positions to thus establish and maintain a pressure which, as a rule, is below the maximum achievable pressure.

The balls 124d of the improved torque sensor 124 move radially of the axis of the shaft I in response to changes of transmission ratio even if the magnitude of the transmitted torque remains unchanged.

An advantage of the improved transmission over that which is disclosed in the published German patent application Serial No. 28 46 546 is that the radius of the annular array of balls 124d (i.e., the annulus consisting of points of contact between the balls 124d and the surfaces 135 of the ramps 124b and 124c) varies in response to changes of the transmission ratio. This ensures that the balls 124d can transmit greater torque if they are moved radially outwardly so that they form an annulus having a larger radius. This is achieved with surfaces 135 whose slope in the circumferential direction of the shaft I is constant. Thus, all that is necessary for transmission of a greater torque is to ensure that the balls 124d are caused to move radially outwardly of and away from the axis of the shaft I. Otherwise stated, the radial movability of the balls 124d can exert a beneficial influence upon the torque to be transmitted from the prime mover PM by the simple expedient of ensuring that the balls will move radially outwardly in order to guarantee that the required or desired clamping force upon the balls will correspond to the torque which is to be transmitted from the prime mover PM to the shaft II.

Furthermore, and as already described hereinbefore, it is often desirable to configurate the surfaces 135 in such a way that, when the ratio of the continuously variable speed transmission is changed, the balls 124d are caused to move radially as well as axially of the shaft I. In other words, each of the balls 124d then performs a composite movement having a component in the axial direction and a component in the radial direction of the shaft I.

Balls constitute the presently preferred rolling elements for use in the torque sensor of the present invention.

The provision of the motor 109 exhibits the advantage that it contributes to simplicity and reliability of the transmission. The pressure of fluid in the chamber 109a of the motor 109 is a function of the transmitted torque and of the selected transmission ratio. The arrangement may be such that the axially movable ramp 124c can constitute or carry the piston 110 or the cylinder 108 of the motor 109, i.e., the axially movable ramp can be acted upon directly by pressure which is supplied by the torque sensor 124. However, it is equally within the purview of the invention to design the torque sensor 124 in such a way that it comprise its own cylinder chamber or space 124a (as actually shown in FIG. 2). The axially movable ramp 124c or a discrete valve (note the aforediscussed valving element 131) then controls the outflow of pressurized fluid from the cylinder chamber 124a by way of the outlet 124e. The chamber 124a is connected with the motor 109 which can move the flange 101a axially of the shaft I. The rate of flow of fluid through the outlet 124e is related to the position of the axially movable ramp or piston of the torque sensor. Such axially movable ramp or piston is further acted upon by forces which are applied by the balls 124d in dependency on the torque to be transmitted to the shaft II. The axially movable part or ramp 124c of the torque sensor 124 thus constitutes a yieldable pad between the body of fluid (such as oil) in the chamber 124a and the balls 124d.

The frustoconical guide member 130 constitutes a simple but effective means for ensuring proper radial movements of the balls 124d during axial displacement of the flange 101a relative to the shaft I. As already explained hereinabove, the guide member 130 shares the axial movements of the flange 101a, and the diameter of its ball-contacting conical internal surface increases in a direction from the gear 126 toward the flange 101a of the adjustable sheave 101. The provision of the guide member 130 is particularly advantageous in a transmission of the type shown in FIG. 2, namely in a transmission wherein the balls 124d of the torque sensor 124 are compelled to move radially outwardly in response to increasing torque. The feature that the diameter of the ball-contacting conical internal surface of the guide member 130 increases in a direction toward the flange 101a of the adjustable sheave 101 ensures that, when the ratio of the improved transmission is such that the endless flexible element 103 is close to the axis of the shaft 1, the balls 124d are located at the radially outer regions of the surfaces 135 of the ramps 124b, 124c. The slope of the surfaces 135 at the radially outer portions of the ramps 124b, 124c is less pronounced so that the force with which the flanges of the sheave 101 bear against the adjacent portion of the endless flexible element 103 is more pronounced. If the transmission ratio is thereupon changed, the guide member 130 forces the balls 124d radially inwardly and the force with which the flanges of the sheave 101 bear against the endless flexible element 103 can be reduced as the radius of the looped portion of the element 103 between the flanges of the sheave 101 increases. This is due to the changes of inclination of the surfaces 135 at the locations of contact with the balls 124d.

The just described conical guide member 130 can be employed with particular advantage in transmissions the type wherein the torque sensor 124 is installed at the primary side to cooperate with the adjustable sheave (101) which is first to receive torque from the prime mover PM.

It is possible to modify the illustrated transmission in such a way that the magnitude of the force acting upon the endless flexible element 103 is less pronounced when the flexible element is nearer to the axis of the shaft I. This necessitates certain changes in the configuration of the surfaces 135 and/or other parts which guide the balls 124d in the radial direction of the shaft I. Such situation may arise if the torque sensor 124 is associated with the adjustable sheave (such as the sheave 2 of FIG. 1) at the secondary side of the transmission. Under such circumstances, the pressure which is generated by the torque sensor 124 is preferably caused to act upon a fluid-operated motor which controls the movements of the axially movable flange of the adjustable sheave at the secondary side of the transmission.

In accordance with a further feature of the invention, the surfaces 135 of the ramps 124b, 124c can be configurated in such a way that they are arched or bent in the circumferential direction. The arching or bending is such that, if the torque sensor is to transmit an abruptly developing surge of torque and its balls are caused to roll along the surfaces of the ramps, the angles of those portions of the ramp surfaces which are contacted by the balls vary preferably in a manner to decrease radially outwardly which brings about a more pronounced tensioning of the endless flexible element between the flanges of the respective adjustable sheave, i.e., the likelihood of slippage or skidding of the flanges relative to the endless flexible element 103 and/or vice versa is reduced.

FIG. 3 shows that each of the surfaces 135 has several portions which confront the adjacent portions of the other of these surfaces. Such confronting portions of the surfaces 135 are inclined relative to each other at different angles. The rolling elements 124d move radially of the shaft I in response to a change of the transmission ratio. When considered in the radial direction (as indicated by the arrow III in FIG. 2), the radially outer portions of the surfaces establish for the rolling elements 124d an angle of attack as indicated by the line 134 of FIG. 3. On the other hand, the radially inner portions of the surfaces 135 establish for the rolling elements 124d an angle of attack as indicated by the line 133 in FIG. 3. This Figure further shows that the angle between the radially inner portions (133) of the surfaces 135 (with reference to the rolling element 124d which is shown in FIG. 3) make an angle which is smaller than that between the radially outer surface portions (134).

FIG. 3 further shows that the rolling element 124d is caused to move within substantially V-shaped grooves of the surfaces 135 in response to angular displacement of the ramps 124b, 124c relative to each other. Those flanks of the grooves in the surfaces 135 which are located diametrically opposite each other (with reference to the rolling element 124d between them) provide for the respective rolling elements parallel contact lines extending at least substantially tangentially of such rolling elements. More specifically, that portion of the right-hand surface 135 in FIG. 3 which extends along the line 134 is at least substantially parallel to the line 134a at the diametrically opposite side of the rolling element 124d which is shown in FIG. 3. The same applies for those portions of the surfaces 135 which extend along the lines 133, 133a. The two substantially V-shaped grooves which can be seen in FIG. 3 are configurated in such a way that the two flanks of each of these grooves exhibit a gradual transition from the inclination indicated by the line 134 or 134a to the inclination indicated by the line 133 or 133a. This ensures that each rolling element 124d always engages substantially tangentially extending lines of contact at the two surfaces 135. Such lines of contact (for each of the rolling elements 124d) are disposed diametrically opposite each other and are at least nearly parallel to one another. The situation is the same in the embodiment which is shown in FIGS. 4 and 5.

The surfaces 135 include radially extending portions which transmit to the illustrated rolling element 124d a force generated by the transmitted torque and having a component acting in the radial direction of the shaft I. Thus, the surfaces 135 vary, in a direction radially inwardly toward the shaft I, as indicated by the lines 134, 134a and 133, 133a. When called upon to transmit torque, the rolling elements 124d are urged to move radially outwardly because the slope of the surfaces 135 decreases in such direction. Otherwise stated, the surfaces 135 cause the generation of a force which acts radially of the shaft I and tends to move the rolling elements 124d outwardly whenever the torque sensor including the ramps 124b, 124c transmits torque.

The configuration of the surfaces 135 is such that the just discussed force acting radially of the shaft I constitutes one component of a composite force further including a component acting in the direction of the axis of the shaft I. The axial component will normally exceed, preferably greatly exceed, the radial component of such composite force.

Figure 4:
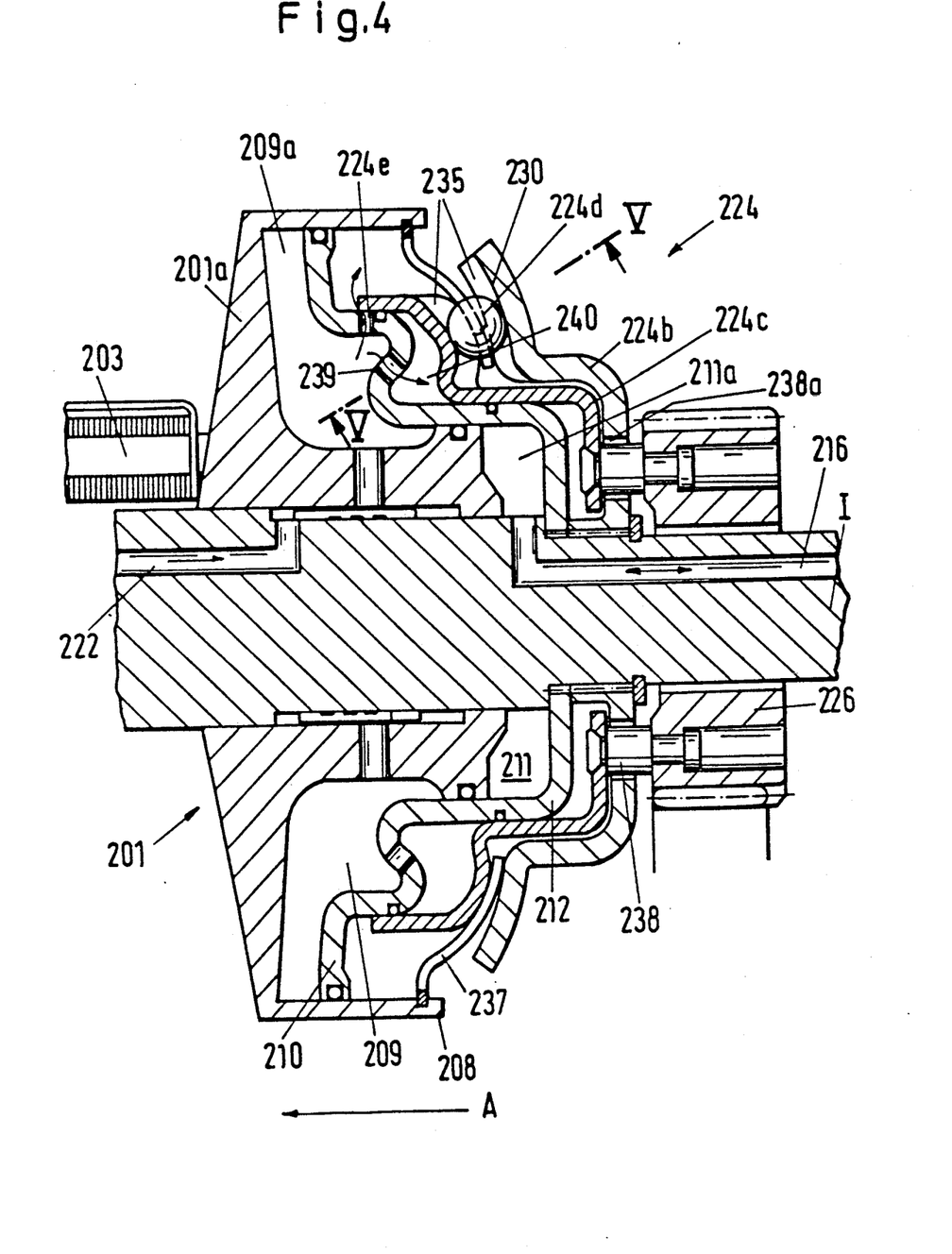
FIG. 4 is a view similar to that of FIG. 2 but showing the details of a second presently preferred embodiment of the torque sensor.
Figure 5:
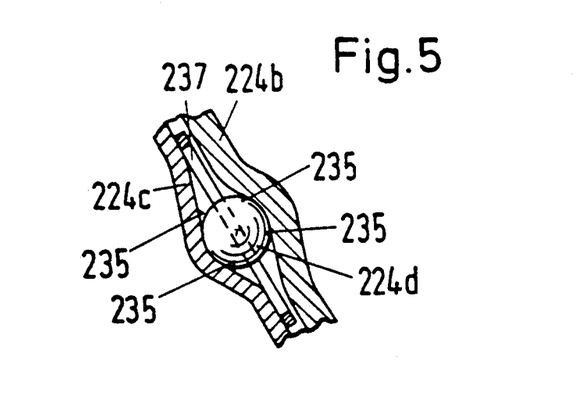
FIG. 5 is a fragmentary sectional view substantially as seen in the direction of arrows from the line V—V in FIG. 4.

FIG. 4 illustrates a portion of a further continuously variable speed transmission. All such parts of this transmission which are identical with or clearly analogous to corresponding parts of the transmission of FIGS. 2 and 3 are denoted by similar reference characters plus 100. The gear 226 receives torque from a prime mover PM (not shown) and is fixedly connected to the axially movable ramp 224c of the torque sensor 224 by a set of axially parallel rivets 238 or analogous fasteners. Thus, the gear 226 and the ramp 224c can move as a unit (to a limited extent) axially of the shaft I which carries the adjustable sheave 201 including a fixedly mounted flange (not shown) and an axially movable flange 201a. The gear 226 is free to perform limited angular movements relative to the shaft I, and such angular movements are also shared by the axially movable ramp 224c. The other ramp 224b of the torque sensor 224 is non-rotatably fixed to and cannot move axially of the shaft I. The median portions of the fasteners 238 extend, with requisite clearance, through windows 238a which are provided in the ramp 224b. It will be seen that the radially inner portion of the ramp 224b extends substantially radially of the shaft I and is disposed between the radially inner portion of the ramp 224c and the gear 226. The radially outer portions of the ramps 224b, 224c flank an annulus or set of balls 224d which act as spreading means for the axially movable ramp 224b and are further confined in a cage or enclosure 237 affixed to the cylinder 208 of the motor 209. The cage 237 can constitute a suitably configurated washer-like body of resilient material with guide slots for individual balls 224d. This cage does not prevent the balls 224d from contacting the surfaces 235 of the ramps 224b and 224c.

The guide member 230 is mounted on the ramp 224b, i.e., on the ramp which is non-movably affixed to the shaft I. The purpose of the guide member 230 is the same as that of the guide member 130 in the transmission of FIG. 2, i.e., such guide member applies to the balls 224d a pressure which is dependent upon the selected transmission ratio, namely upon the axial position of the axially movable flange 201a of the adjustable sheave 201 on the shaft I.

The torque which the prime mover PM applies to the shaft I through the gear 226, fasteners 238 and the ramp 224c of the torque sensor 224 is transmitted by the balls 224d, the axially fixed ramp 224b and the shaft I to the sheave 201 which causes the endless flexible element 203 to transmit torque to the other sheave, corresponding to the sheave 2 of FIG. 1, and thence to the second shaft II. The transmission of torque via torque sensor 224 results in certain angular displacement of the ramps 224b, 224c relative to each other whereby the balls 224d roll along the adjacent portions of the surfaces 235 by reacting against the axially fixed ramp 224b and by thus causing the axially movable ramp 224c to move in the direction of arrow A (i.e., to the left, as viewed in FIG. 4). The axially movable ramp 224c simultaneously performs the function of a valving element or piston in that it changes the effective cross-sectional area of the outlet 224e as a function of its axial position relative to the shaft I. The outlet 224e is in communication with the cylinder chamber 209a of the radially outer motor (cylinder and piston unit) 209.

The extent of axial movement of the ramp 224c in the direction of arrow A is a function of the magnitude of the torque to be transmitted by the torque sensor 224 and/or of the surge of torque which is to be compensated for. Such leftward movement of the ramp 224c results in gradual or abrupt reduction of the effective cross-sectional area of the outlet 224e and in rapid and pronounced rise of fluid pressure in the cylinder chamber 209a of the motor 209 because the pump 20 (not shown in FIG. 4) continuously supplies pressurized fluid at a constant rate; such fluid enters the cylinder chamber 209a through the conduit 222.

FIG. 4 further shows a compensating or resetting pressure chamber or compartment 240 which is in communication with the cylinder chamber 209a through one or more overflow ports 239 in the piston 210 of the motor 209. The purpose of the compartment 240 is to cause the axially movable ramp 224c to assume (in response to a reduction of torque and/or subsequent to termination of a surge of transmitted torque) a position which corresponds to the prevailing torque. Thus, pressurized fluid in the compartment 240 causes the ramp 224c (the pressure in the compartment 240 matches that in the cylinder chamber 209a) to move counter to the direction which is indicated by the arrow A. This results in at least partial increase (or in greater increase) of the effective cross-sectional area of the outlet 224e so that the pressure in the cylinder chamber 209a and in the compartment 240 can decrease.

FIG. 5 shows the configuration of portions of the surfaces 235 of ramps 224b, 224c as seen from the line V—V in FIG. 4. The surfaces 235 are not symmetrical to each other in the circumferential direction of the torque sensor 224. In other words, the regulating characteristics are or the progress of pressure rise is patterned in a first manner when the transmission is to push a load and in a different second manner when the transmission is to pull a load.

The enclosure or cage 237 guides the balls 224d during movement in the radial direction of the shaft I. This cage shares the movements of the axially movable flange 201a of the adjustable sheave 201. The cage 237 can be replaced by or used jointly with otherwise configurated means for controlling radial movements of the balls 224d in response to axial movement of the ramp 224c relative to the ramp 224b. The slots or recesses of the cage 237 for the balls 224d can be bounded by guide surfaces which are inclined with reference to the direction of axial movement of the flange 201a, or the cage itself can be inclined in a manner to ensure that the balls 224d will move radially of the axis of the shaft I in response to axial movement of the ramp 224c relative to the ramp 224b.

The rolling elements 224d will move radially and axially of the shaft I in response to a change of transmission ratio because the surfaces 235 are configured with a view to cause such movements in response to angular movement of the ramps 224b, 224c relative to each other. For example the surface 235 on the axially fixed ramp 224b extends radially of the shaft I and also exhibits an inclination in the axial direction of this shaft. This compels the rolling elements 224d to perform movements in the radial and axial directions of the shaft I in response to each change of the transmission ratio.

Figure 6:
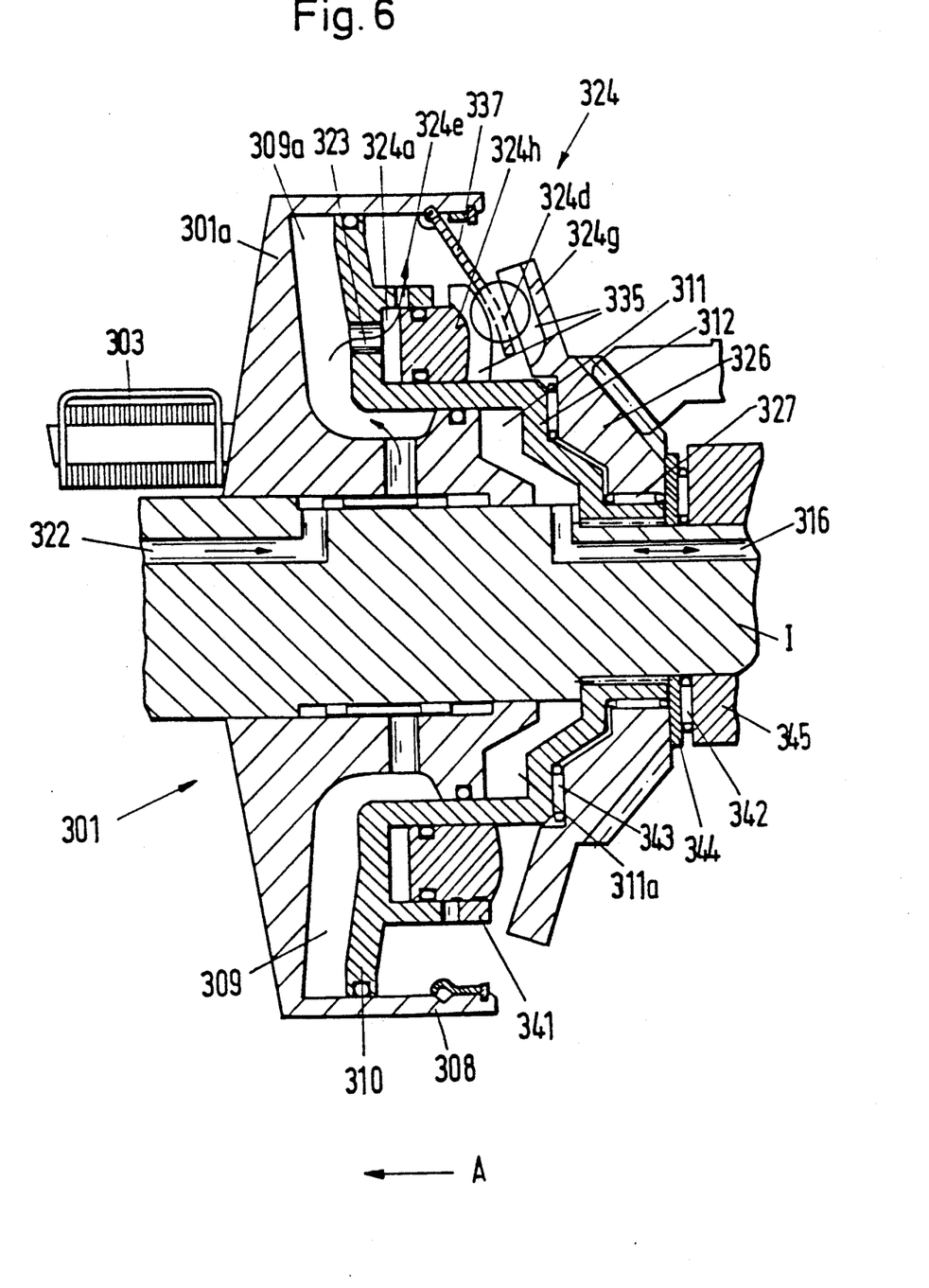
FIG. 6, is a sectional view similar to that of FIG. 2 or 4 but showing the details of a further torque sensor.

FIG. 6 shows a portion of a further transmission. All such parts which are identical with or clearly analogous to corresponding parts of the transmission of FIGS. 2 and 3 are denoted by similar reference characters plus 200. The gear 326 is mounted on the shaft I adjacent a needle bearing 327 which is adjacent a washer 344. A thrust or axial needle bearing 342 is adjacent an annular retainer or stop 345 which is affixed to the shaft I. The needle bearing 342 is disposed between the retainer 345 and the washer 344, and a further thrust or axial needle bearing 343 is installed between the gear 326 and the cylinder 312 of the motor 311. The gear 326 is of one piece with or is fixedly secured to a ramp 324g of the torque sensor 324. The ramp 324g can share the angular movements of the gear 326 relative to but cannot move axially of the shaft I.

The piston 310 of the motor 311 has an internally toothed or fluted portion 341 in mesh with the adjacent externally toothed or fluted portion of a second ramp 324h of the torque sensor 324. The arrangement is such that the ramp 324h cannot rotate relative to but can move axially of the piston 310. The ramp 324h further performs the function of a valving element or piston which controls the effective cross-sectional area of the outlet 324e serving to connect the cylinder chamber or space 324a of the torque sensor 324 with the sump.

It will be seen that, in contrast to the heretofore fully described torque sensors 124 and 224, neither of the two ramps 324g, 324h of the torque sensor 324 is rigidly affixed to the shaft I. The ramp 324g is held against axial movement but is rotatable relative to the shaft I; on the other hand, the ramp 324h cannot turn on but can move axially of the shaft I. The balls 324d are disposed between the confronting surfaces 335 of the ramps 324g, 324h and are further confined in a cage or enclosure 337 which is carried by the cylinder 308 of the outer motor 309. It is possible to replace the single cage 337 with a plurality of discrete cages, e.g.,, one for each of the balls 324d. Each such discrete cage can be mounted on the axially movable flange 301a of the adjustable sheave 301 or on a part (such as the cylinder 308) which is non-rotatably affixed to or is of one piece with the flange 301a.

The fluid pressure which is a function of the selected transmission ratio is established by a first pump (not shown in FIG. 6 but corresponding to the pump 14 of FIG. 1) and is propagated into the channel or conduit 316 of the shaft I. Such fluid is supplied, at a constant rate, into the cylinder chamber 311a of the motor 311 which is installed radially inwardly of the motor 309.

The just discussed pressure is superimposed upon the pressure which is established by the torque sensor 324 and is indicative of the magnitude of transmitted torque. To this end, a second pump (corresponding to the pump 20 of FIG. 1) supplies pressurized fluid (e.g., oil) into a conduit or channel 322 which is provided in the shaft I and admits pressurized fluid at a constant volumetric rate into the cylinder chamber 309a of the motor 309. The channel or conduit 323 serves to supply pressurized fluid from the cylinder chamber 309a into the cylinder chamber or space 324a of the torque sensor 324.

If the torque sensor 324 is to transmit a pronounced torque or a sudden surge of torque, the balls 324d roll along the surfaces 335 of the ramps 324g, 324h and move the ramp 324h axially of the shaft I in a direction to the left, i.e., as indicated by the arrow A. The ramp 324h then acts not unlike a valving element or piston and varies the effective cross-sectional area of the outlet 324e in a sense to reduce the effective cross-sectional area and to thus abruptly raise the pressure of fluid in the chamber or space 324a. The fluid pressure also rises in the cylinder chamber 309a as well as in the conduits 322, 323, and this causes the axially movable flange 301a to exert a greater force against the adjacent looped portion of the endless flexible element 303.

The improved torque sensor can be utilized with particular advantage in transmissions of the type described, for example, in published German patent application No. 41 03 214.4 corresponding to the aforementioned commonly owned copending U.S. patent application Ser. No. 07/830,182 of Norbert Indlekofer and Oswald Friedman. The torque sensor which is utilized in the transmission of the present invention can take over the function of the torque sensor 24 as well as the function of the pressure controlling device 25 in the transmission of Indlekofer et al. In other words, by utilizing the torque sensor of the transmission which is described in the present application, one can dispense with the pressure controlling device 25 of Indlekofer et al.

The drawings merely show certain presently preferred embodiments of the improved continuously variable speed transmission. Other modifications can be adopted and/or incorporated without departing from the spirit of the invention. For example, the features of the embodiment of FIGS. 2–3 can be combined with those of the embodiment of FIGS. 4–5 and/or with those of the embodiment of FIG. 6. Furthermore, at least certain components of the improved transmission, such as the torque sensor 124, 224 or 324, constitute innovations which are believed to be worthy of patent protection independently of their use in a transmission of the type shown in FIGS. 2–3, FIGS. 4–5 and/or FIG. 6.

A novel infinitely variable speed transmission with two adjustable sheaves can be constructed, assembled and operated in the following way: The axially movable flange of at least one (the primary or the secondary) adjustable sheave can be acted upon by a cylinder and piston unit which can receive pressurized fluid whose pressure is dependent upon the load and on the selected transmission ratio. The pressurized fluid is supplied by a pump through a torque sensor which comprises or constitutes at least one pressure regulating valve and is provided with rolling elements (such as balls) and with surfaces which cooperate with the rolling elements. The surfaces ensure that the valve or valves can be adjusted to establish a pressure which is a function of transmitted load and of the selected transmission ratio. The torque is transmitted to the flanges of the corresponding sheave, and such flanges are non-rotatably affixed to a shaft. The rolling elements transmit to the flanges of the respective sheave the entire torque which is to be transmitted by the improved continuously variable speed transmission.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A continuously variable speed transmission comprising:

first and second sheaves rotatable about first and second axes, respectively, one of said sheaves comprising a first flange and a second flange coaxial with and movable axially toward and away from the first flange;

means for applying torque to said first sheave;

a tensionable endless flexible torque transmitting element trained over said sheaves;

means for moving said second flange to change the ratio of the transmission, and means for varying the tension of said flexible element, said means for varying including a torque sensor rotatable about one of said axes and connected with said torque applying means, said torque sensor including first and second opposing surfaces having at least one rolling element arranged therebetween and in contact therewith so as to generate torque and transmission ratio-dependent forces, said surfaces being configured such that said at least one rolling element is movable relative to said surfaces at least radially of said one axis in response to changes of said transmission ratio.

2. The transmission of claim 1, wherein each of said sheaves comprises a first flange and a second flange coaxial with and movable axially toward and away from the respective first flange.

3. The transmission of claim 1, wherein said torque sensor comprises a plurality of rolling elements between said surfaces.

4. The transmission of claim 1, wherein said at least one rolling element comprises a sphere.

5. The transmission of claim 1, wherein said surfaces are configured to further effect a movement of said at least one rolling element in the direction of said one axis in response to changes of said transmission ratio.

6. The transmission of claim 1, wherein each of said first and second opposing surfaces of said torque sensor has a ramp extending in the radial direction which opposes the ramp of the other surface, at least a pair of portions along the radial extent of both ramps being inclined relative to each other at different angles in the different portions, said at least one rolling element riding in said portions of the opposing ramps of the opposing surfaces in dependence on the ratio of the transmission.

7. The transmission of claim 1, wherein said at least one rolling element is a sphere and said opposing surfaces each define for said at least one rolling element a substantially V-shaped groove extending substantially radially of said one axis with the groove of the opposing surface being aligned and the said at least one rolling element contained therein.

8. The transmission of claim 7, wherein each said surface includes flanks disposed in the respective groove and providing for said at least one rolling element parallel contact lines extending tangentially of said at least one rolling element.

9. The transmission of claim 1, wherein said surfaces include radially extending portions which transmit to said at least one rolling element a force generated by the transmitted torque and having a component acting in the radial direction of said one axis.

10. The transmission of claim 9, wherein said force has a second component acting upon said at least one rolling element in the direction of said one axis and greatly exceeding said component acting in the radial direction of said one axis.

11. The transmission of claim 1, wherein said flexible element transmits torque from said first sheave to said second sheave and said torque sensor is disposed between said torque applying means and said first sheave.

12. The transmission of claim 1, wherein said moving means further comprises at least one fluid operated motor which is controlled by said torque sensor as a function of transmitted torque and transmission ratio.

13. The transmission of claim 1, wherein said torque sensor is rotatable about the axis of said one sheave and said at least one rolling element is movable at least radially of said one axis in response to axial movement of said second flange.

14. The transmission of claim 13, wherein said sensor further comprises a cage for said at least one rolling element.

15. The transmission of claim 14, wherein said cage is connected with said second flange.

16. The transmission of claim 13, wherein said second flange comprises a substantially conical guide for said at least one rolling element.

17. The transmission of claim 16, wherein said guide is coaxial with said torque sensor.

18. The transmission of claim 17, wherein said guide has a frustoconical surface with a diameter which increases in the direction of said one axis toward said second flange.

19. The transmission of claim 1, wherein said one sheave further comprises a shaft nonrotatably supporting said flanges.

20. A continuously variable torque transmitting speed transmission comprising:

first and second sheaves rotatable about first and second axes, respectively, each of said sheaves comprising a first flange and a second flange coaxial with and movable axially toward and away from the respective first flange and at least one of said sheaves further having a shaft non-rotatably mounting the respective sheaves;

means for applying torque to said first sheave;

an endless flexible torque transmitting element trained over said sheaves;

means for moving the second flange of said at least one sheave, including at least one fluid operated motor;

means for supplying pressurized fluid to said motor as a function of the load and the ratio of the transmission, including a pump; and a torque sensor receiving fluid from said pump and having at least one pressure regulating valve, and first and second opposing surfaces having at least one rolling element therebetween and in contact therewith, said surfaces and rolling element being configured to generate load and transmission ratio-dependent forces, and at least one rolling element in contact with and movable relative to said surfaces at least radially of said one axis and arranged to transmit to said at least one sheave the entire torque to be transmitted by the transmission.

* * * * *